US007464725B2

(12) United States Patent
Ziwica

(10) Patent No.: US 7,464,725 B2
(45) Date of Patent: Dec. 16, 2008

(54) AIR DISTRIBUTOR FOR A COMPRESSED-AIR-OPERATED POWDER TRANSPORTATION UNIT OF A POWDER COATING DEVICE

(75) Inventor: Daniel Ziwica, Arbon/TG (CH)

(73) Assignee: J. Wagner AG, Altstatten (CH)

( * ) Notice: Subject to any disclaimer, the term of this patent is extended or adjusted under 35 U.S.C. 154(b) by 438 days.

(21) Appl. No.: 11/197,071

(22) Filed: Aug. 4, 2005

(65) Prior Publication Data

US 2006/0039762 A1 Feb. 23, 2006

(30) Foreign Application Priority Data

Aug. 23, 2004 (DE) .................. 20 2004 013 138 U

(51) Int. Cl.
*F16K 11/07* (2006.01)

(52) U.S. Cl. .................................... 137/625.5; 137/625

(58) Field of Classification Search ................. 137/625, 137/625.42, 625.5; 406/86, 136
See application file for complete search history.

(56) References Cited

U.S. PATENT DOCUMENTS 2,969,091 A * 1/1961 Wolff ...................... 137/625.5
2,980,139 A * 4/1961 Lynn ...................... 137/625.5
3,057,377 A * 10/1962 Chatham et al. ......... 137/625.5
3,868,969 A * 3/1975 Schwenk ................. 137/625.5
5,074,329 A * 12/1991 Havemann et al. ....... 137/625.5
5,121,947 A * 6/1992 Lee et al. ................. 137/625.5
7,331,362 B2 * 2/2008 Huei ...................... 137/625.5

* cited by examiner

*Primary Examiner*—John Fox
(74) *Attorney, Agent, or Firm*—Renner, Otto, Boisselle & Sklar, LLP

(57) ABSTRACT

The air distributor according to the invention is provided with an air distributor housing (30) that has an assembly opening, a compressed air inlet (31.2) and a first and a second compressed air outlet (36, 37). The air distributor is further provided with a sheath (39) that can be built into the assembly opening and comprises an air channel (43, 44) that is connected to the first compressed air outlet (37). Lastly, the air distributor is provided with a setting element (38.1) that, together with the sheath (39), constitutes a first valve by means of which the compressed air inlet (31.2) can be connected to the first air channel (43, 44) and the first compressed air outlet (37). The setting element (38.1), together with the air distributor housing (30), constitutes a second valve by means of which the compressed air inlet (31.2) can be connected to the second compressed air outlet (36), where the opening widths (41, 42) of the two valves can be set by means of the position of the setting element (38.1).

13 Claims, 5 Drawing Sheets

A-A

A-A

AIR DISTRIBUTOR FOR A COMPRESSED-AIR-OPERATED POWDER TRANSPORTATION UNIT OF A POWDER COATING DEVICE

TECHNICAL FIELD

The invention relates to a compressed air distributor for a compressed-air-operated powder transportation unit of a powder coating device.

RELEVANT ART

Form prior art DE 202 17 416 a device for the coating of a work piece with powder is known. In the powder coating plant described in this publication the work pieces to be coated are transported into a booth in order to be there coated with the help of one or several spray pistols. To this end the work pieces are transported through the booth suspended from a guide rail or a conveyor belt. According to the geometric shape of the work piece to be coated, it may be necessary to have recourse to manual coating for parts of the work piece that cannot be reached or cannot be coated with adequate quality with the help of automatically operating spray pistols. To this end, the booth is provided with an area for manual coating. Several spray pistols arranged side by side with each other are attached to a guide arm in the part of the booth in which the automatic coating is performed. The guide arm is designed in such a manner that the powder spray pistols can be moved at right angles to the transport direction of the work piece in both the vertical direction and the horizontal direction.

In order to supply powder to the powder spray pistols that are used for coating the work piece, use is made of a powder transportation unit operated by means of compressed air, which hereinafter will also be referred to as injector. Injectors of this type are normally provided with a jet transportation nozzle, a mixing nozzle with a mixing nozzle channel arranged at some distance opposite the transportation nozzle and a powder suction aperture arranged either on or between the transportation jet nozzle and the mixing nozzle. Compressed air, hereinafter referred to as transportation air, is blown through the transportation jet nozzle in the direction of the injector outlet. When this is done, an underpressure is created in the suction tube of the injector and this makes sure that the powder will be transported through the suction tube from a powder storage container in the direction of the powder spray pistols. The injector thus functions in accordance with the principle of a Venturi tube. Furthermore, dosing air is introduced into the mixing nozzle, where care must be taken to assure that the total air, i.e. the sum of the transportation air and the dosing air, remains constant. For example, if the quantity of the powder to be transported is to be reduced, this is done by means of a reduction of the stream of transportation air, i.e. the quantity of transportation air per unit time. But this also reduces the flow speed in the powder transportation hose arranged after the injector, which must then be corrected by increasing the flow of dosing air. On the other hand, if the quantity of the powder to be transported is to be increased, this is done by stepping up the flow of transportation air. It is thus the aim to keep constant the total air flow, i.e. the total air volume per time unit. In this way it is possible to avoid undesired effects, for example, a pulsation of the powder to be transported. The operating personnel is thus faced with the problem that an adjustment of the transportation air flow must be accompanied by an adjustment of the flow of dosing air in order to satisfy the requirement of a constant total air flow.

The monitoring and setting of two quantities that mutually influence each other calls for considerable experience on the part of the operating personnel.

In order to reduce the aforementioned difficulties in the setting of the individual air flows, there has been suggested an air divider valve designed as described in the publication DE 44 09 493 A1. The air divider valve there proposed comprises two valve means for regulating the transportation air and the dosing air that are coupled with each other and act in opposite directions. The air divider valve is designed as a single-shaft double valve and comprises a valve body firmly joined to the shaft, the supply of air being essentially provided midway between the two valve bodies. The division of the air is obtained by moving the shaft and the valve bodies in the longitudinal direction, with the one valve body being moved towards the corresponding valve seating, while the other valve body is moved away from the corresponding valve seating. The valve bodies and the valve seating are both of a conical shape.

The displacement of the shaft and the valve bodies is obtained by means of a rotatable wheel, though there is no linear relationship between a change in the position of the wheel and the air distribution that is thereby effected. Furthermore, the solution proposed in this publication has the disadvantage that the assembly of the air distribution valve is relatively costly. Use is thus made of a two-part valve body that can be assembled only in the housing of the air distributor. Subsequently, a closure has to be screwed onto each of the two sides of the housing from which the valve bodies are inserted. A further disadvantage consists of the fact that if the twopart valve body is to be tightly closed on both sides, each side will need a gasket of its own. Lastly, even the adjustment and the balancing of the air distributor is associated with costs. Tolerances in the production of the valve body and the air distributor body can lead to a considerable cost for calibrating the rotatable wheel. This will be the case, for example, when a certain air flow through the air transportation channel of all the air distributor valves to be produced is always to correspond to the same position of the rotatable wheel. If the cost of the calibration is to be reduced, the tolerances of the design version described in DE 44 09 493 A1 have to be kept very small, and this implies a considerable production cost of the air distributor valves.

SUMMARY OF THE INVENTION

An object of the invention is therefore to describe an air distributor in which the assembly of the individual components of the air distributor can be effected in a quick and simple manner and the number of components is as small as possible.

Furthermore, the requirements for the tolerances that have to be satisfied by the individual components shall become less stringent and the cost of the calibration of the air distributor shall likewise be minimized.

The object is solved by means of an air distributor for a powder transportation unit of a compressed-air-operated powder coating device having the characteristics in accordance with claim 1.

According to the invention, the air distributor for a powder transportation unit of a powder coating device operated by means of compressed air comprises an air distributor housing that is provided with an assembly opening, a compressed air inlet and a first and a second compressed air outlet. Furthermore, the air distributor is provided with a sheath that can be built into the assembly opening and envelops an air channel that is connected to the first compressed air outlet. Lastly, the air distributor is also provided with a setting element that together with the sheath constitutes a first valve by means of which the first compressed air inlet can be connected to the first air channel and the first compressed air outlet, where the opening widths of both valves can be set by means of the position of the setting element.

Further advantageous embodiments of the invention derive from the characteristics stated in the dependent claims.

In an embodiment of the air distributor in accordance with the invention the setting element is associated with a setting shaft and an opening is provided in the sheath through which this setting shaft projects. This has the advantage that the sheath also serves as guide for the setting shaft.

Alternatively, the setting element of a second embodiment of the invention can be connected to a setting shaft and in the air distributor housing there can be provided an opening through which the setting shaft projects.

Advantageously, the setting element in the air distributor is formed cylindrically and supported in such a manner as to permit it to be moved in the axial direction. Such a setting element can be produced in a simple manner and at a favourable cost.

It is also advantageous when the first face side of the setting element and the face side of the sheath of the air distributor in accordance with the invention running in parallel therewith constitute the first valve opening and the second face side of the setting element and a surface of the air distributor housing arranged opposite this second face side and running parallel with it constitute the second valve opening. Depending on the position of the setting element, this makes it possible to form an air slot both between the face side of the sheath and the first face side of the setting element and also between the second face side of the setting element and this surface lying opposite it in the housing. The opening widths of the air slots are directly coupled with each other. When the setting element is displaced, one of the two slots becomes enlarged, while the other is correspondingly reduced in width. Advantageously, the two valves can be designed and constructed in such a manner that the sum of the opening widths of the two slots remains constant.

Over and above this, the air distributor in accordance with the invention may be provided with an air distributor housing made of plastics. This has the advantage that the air distributor housing may also be produced, for example, as an injection-molded component.

Polyoxymethylene, polyamide or polyethylene are suitable, for example, as plastic materials for the air distributor housing.

For solving the object it is further suggested that the air distributor housing, the sheath and the setting element of the air distributor are designed in such a manner that the sum of the air flows that stream through the two valves are constant and independent of the position of the setting element. This is particularly advantageous when the quantity of necessary air introduced for the powder transportation unit, which consists of a transportation air and a dosing air, shall remain constant. This should also be the case when the powder quantity to be conveyed is changed.

According to a further characteristic of the invention, the air distributor may be provided with a compressed air channel in the air distributor housing that is connected to the compressed air inlet.

Furthermore, there may be provided an air regulator in the air distributor housing by means of which the air in the compressed air channel can be set. This makes it possible to set the total quantity of air supplied to a powder transportation unit.

In a further development of the air distributor in accordance with the invention there is provided in the air distributor housing a further compressed air channel that is connected on one side with the air regulator, and on the other side with a third compressed air outlet of the air distributor housing via a further air regulator. The third compressed air outlet can be set by means of this further air regulator. This has the advantage that the quantity of fluidization air that may be necessary for the fluidization of the powder can be set in a powder storage container.

According to a further characteristic of the invention the invention can be improved even further by arranging the setting element and the air regulators in the form of a triangle. This leads to a compact construction.

In an additional embodiment of the invention the setting shafts of the setting element and the air regulator or the air regulators project from one side of the air distributor housing. An air distributor, which is formed in such a manner, can be readily assembled in a control desk. All the setting buttons of the air distributor can then be arranged on one side of the control desk and also become accessible from there.

The air distributor in accordance with the invention may also form part of a superordinate powder transportation system. In that case the compressed air inlet of the air distributor is connected to a compressed air source, the first compressed air outlet of the air distributor to a dosing air connection and the second compressed air outlet of the air distributor to the transportation air connection of a powder transportation unit.

BRIEF DESCRIPTION OF THE DRAWINGS

Below the invention will be further explained by means of several embodiments and with the help of 11 figures.

DETAILED DESCRIPTION OF THE INVENTION

Figure 1:
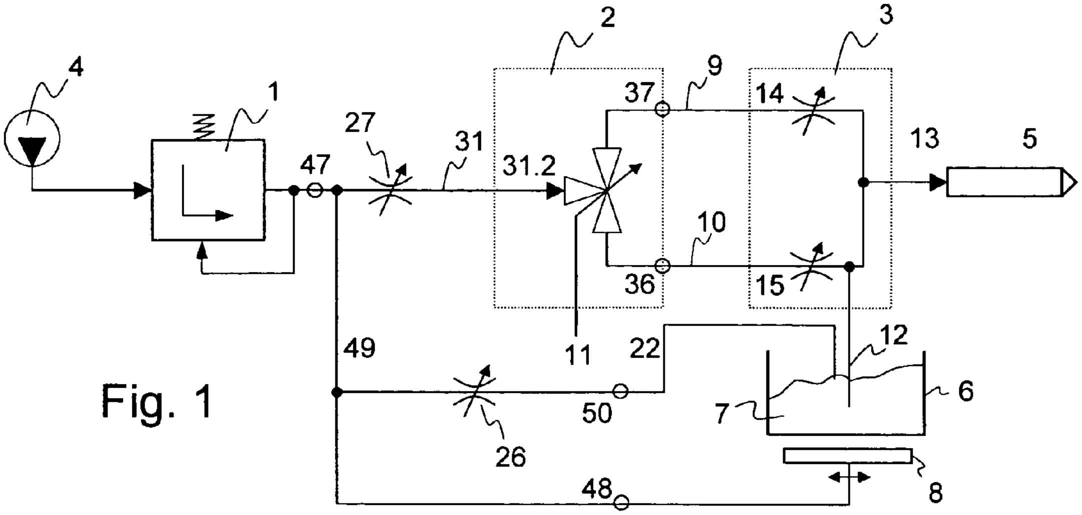
FIG. 1 shows a powder coating device with an air distributor, a powder transportation unit and a powder spray pistol in form of a block diagram.

The schematic structure of a powder coating system with a powder transportation unit 3 and a powder spray pistol 5 is represented in FIG. 1. An air quantity regulator 1 of the powder coating system is supplied with compressed air from a compressed air source 4 and produces at its output 47 a constant compressed air stream that can be set by means of an air regulator 27. This is then lead by means of compressed air line 31 to the inlet 31.2 of a compressed air distributor 2. The compressed air distributor 2 comprises two valves, each of which is connected on its inlet side to the inlet 31.2 of the compressed air distributor 2 and on its outlet side to a first compressed air outlet 36 and a second compressed air outlet 37 of the compressed air distributor 2 respectively. By means of a setting wheel a desired value 11 can be forced and the two valves can be set. The first compressed air outlet 36 of the compressed air distributor 2 constitutes the conveying air outlet and is joined to a compressed air connection 15 of the powder injector 3 by means of a transportation air line 10. The second compressed air outlet 37 of the compressed air distributor 2 constitutes the dosing air outlet that is joined to a dosing air connection 14 of the powder injector 3 by means of a dosing air line 9. The air lines 9 and 10 may be designed as hose lines.

When in operation, the powder injector 3 sucks powder 7 from a powder storage container 6 via a suction line 12 and conveys it via the transportation line 13 to the powder spray pistol 5. The quantity of powder 7 sucked in and transported through the transportation line 13 depends on the magnitude of the transportation air flow set by means of the compressed air distributor 2 and indirectly also by means of the air regulator 27.

Sticking of the powder in the transportation line 13 can be advantageously avoided with the help of the dosing air flow present in addition to the transportation air flow. As a general rule, moreover, it is necessary to fluidize the powder 7 present in the powder storage container 6 in the immediate vicinity of the suction line 12, i.e. to bring it into a state in which it can flow, so that it can be sucked in more readily. A line 22 for the fluidization air is therefore provided, in which the quantity of fluidization air can be set by means of an air regulator 26.

In order to make sure that the powder in the powder storage container 6 will be evenly distributed at all times and powder will be continuously present in the suction area of the suction tube 12, a pneumatically operated vibrator plate 8 is attached to the underside of the powder storage container 6. This is supplied with compressed air via a compressed air line. To this end, the air distributor is provided with a separate compressed air connection 48.

The powder transportation system shown in FIG. 1 may be used, for example, in the powder coating device described in the publication DE 202 17 416.

Figure 2:
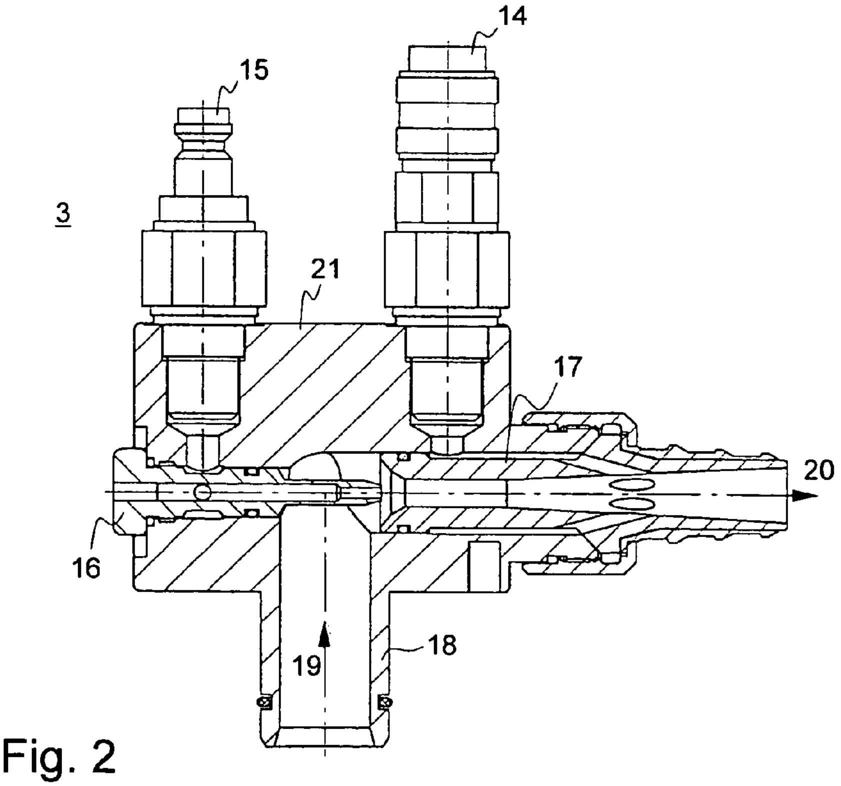
FIG. 2 shows a possible embodiment of a powder transportation unit.

A possible embodiment of the powder injector 3 that can be used in the described powder coating device is shown in FIG. 2. The powder injector 3 is provided with a transportation air connection 15 via which the transportation air arrives at an injector nozzle 16 and from there flows through the injector nozzle opening in the direction of the injector outlet. In accordance with the Venturi principle, the transportation air produces an depression in the suction tube 12, which is connected to the suction intake manifold 18 of the injector 3, and thus transports the powder 7 from the powder storage container 6 in the direction of the powder spray pistol 5. The injector 3 is also provided with a dosing air connection 14 by means of which dosing air is supplied and then passes through a mixing nozzle 17 likewise in the direction of the powder spray pistol 5. The transportation direction of the powder is indicated by the arrows 19 and 20 and the housing of the injector 3 by the reference number 21. Appropriate dimensioning of the mixing nozzle 17 and the injector nozzle 16 makes it possible to exert an influence within certain limits on the transportation air flow and the dosing air flow.

Figure 3:
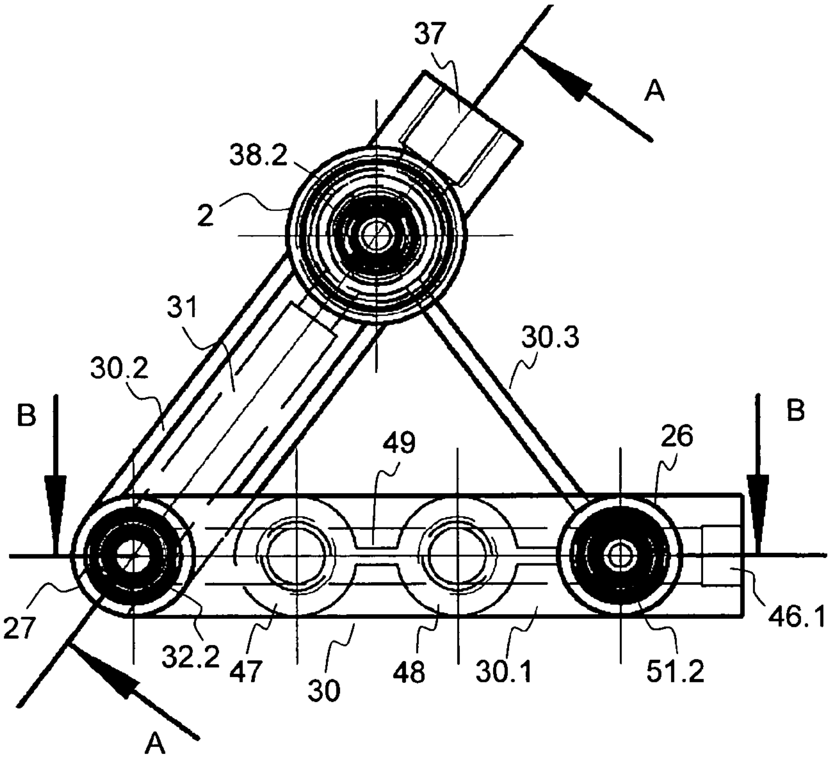
FIG. 3 shows a possible embodiment of the air distributor in accordance with the invention as seen from above.

A first embodiment of the air distributor in accordance with the invention is shown in FIG. 3 as seen from above. The shown air distributor comprises the air regulator 27 for setting the total air quantity that is to be made available to the powder injector 3 as transportation and dosing air. The embodiment of the air distributor shown in FIG. 3 further comprises the compressed air distributor 2, which distributes the total air preset by the air regulator 27 to the two compressed air connections 36 and 37. The air distributor 2 comprises furthermore the compressed air regulator 26 for setting the dosing or fluidization air. To this end, the air distributor housing 30 consists of a first housing limb 30.1 into which there is integrated the total air connection 47 for supplying the entire air distributor with compressed air. The limb 30.1 of the air distributor housing 30 also contains the air connection 48 by means of which the pneumatic vibrator 8 can be supplied with compressed air. The air quantity regulator 26 is provided at the open end of the limb 30.1. The air quantity regulator 27 for the total air quantity is arranged at the intersection point of the two limbs 30.1 and 30.2. An air channel 49 is provided in the limb 30.1 in order to assure that the total air supplied through the total air connection 47 can be led to the compressed air connection 48, to the air regulator 26, and to the total air quantity regulator 27. In order to form the air channel 49, an opening is situated at the free end of the limb 30.1 that is closed with a closure 46.1 when the air distributor is assembled. The two limbs 30.1 and 30.2 are connected to each other by means of a stay 30.3, thus increasing the stability of the air distributor housing.

Figure 4:
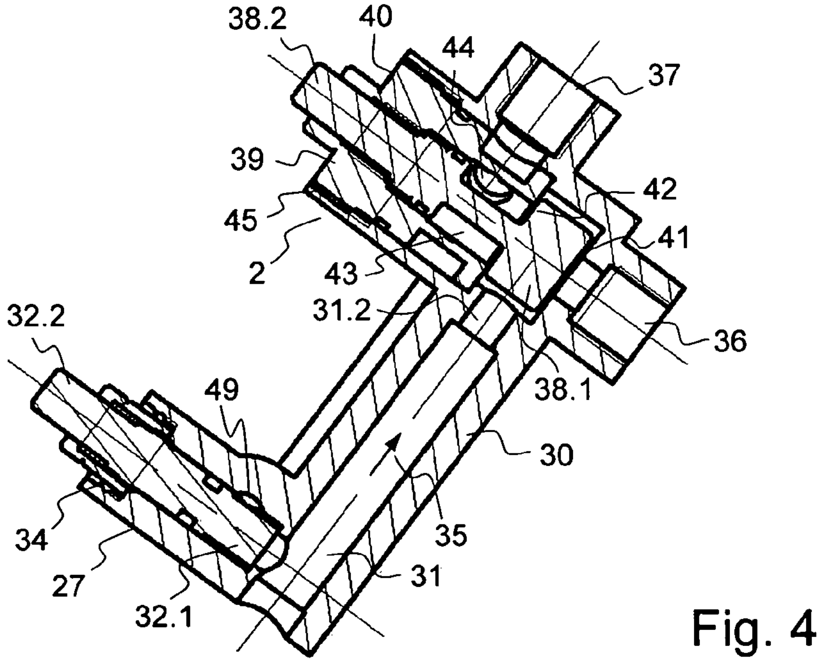
FIG. 4 shows a part of the air distributor in accordance with the invention in cross section.

FIG. 4 shows the cross section of the air distributor along the line indicated by the arrows A-A. The air regulator 27 for the total air is provided with a setting element 32.1 that—as shown in FIG. 4—is formed cylindrically and that is axially displaceable by means of the setting shaft 32.2, which is rotatably supported in the air distributor housing 30. The further the setting shaft 32.2 is screwed out of the housing 30 by means of the thread 34, the more the setting element 32.1 will liberate the connecting channel between the compressed air channel 49 and the air channel 31 for the reduced total air. The total air preset in this manner then flows in the direction of the arrow 35 to the compressed air distributor 2. At this point the air distributor housing 30 is provided with a recess or an assembly opening with an internal thread 45 into which there is screwed a sheath 39 together with the setting element 38.1 and the setting shaft 38.2.

The setting element 38.1 is designed to be of cylindrical shape, with one end face of the cylinder forming a first valve together with the surface of the air distributor housing 30 lying opposite this end face. Rotating the setting element 38.2, which is supported by means of a thread 40 in the sheath 30, it is possible to set the slot 41, which defines the opening width of the first valve. The second end face of the cylindrical setting element 38.1, together with the end face of the sheath 39 that preferably runs in parallel with the second end face, forms a second valve by means of which there can be set the quantity of air that arrives from the compressed air channel 31 to the compressed air outlet 37. The air quantity that arrives at the compressed air outlet 37 along this path is determined by means of the slot 42 in the second valve. The air distributor 2 is designed in such a manner that the slot 41 can be completely closed, so that the entire air supplied through the compressed air inlet 31.2 arrives at the compressed air outlet 37 via the hollow space 43 in the sheath 39 and the opening 44 in the sheath 39. Appropriately modified according to sense, the same applies also to the slot 42. As can be seen from FIG. 4, the sum of the two slot sizes 41 and 42 is constant. The overall slot size, i.e. the sum of the two slot sizes 41 and 42 is defined by the position of the sheath 39. The further the sheath 39 is screwed into the air distributor housing 30 by means of the thread 45, the smaller will be the overall size of the slots.

Such a design of the air pressure distributor 2 has the advantage that there are no particular tolerance requirements that have to be satisfied during the production of the air distributor housing 30, the setting element 38.1 and the sheath 39. Inaccuracies during the production of the three elements 30, 38.1 and 39 can be compensated without problems during the assembly of the compressed air distributor 2. To this end, the setting element 38 together with the setting shaft 38.2 is screwed by means of the screw thread 40 into the sheath 39 right up to the stop in a first working step. This reduces the size of the slot 42 to zero. Afterwards, the entire unit consisting of the set element 38.1, the setting shaft 38.2, and the sheath 39 is screwed by means of the thread 45 into the air distribution housing 30 right up to the stop. With that, also the size of the slot 41 becomes zero. To set the total size of the slots, the entire unit is then screwed out of the air distributor housing by a defined measure until the desired total slot size is attained.

Figure 5:
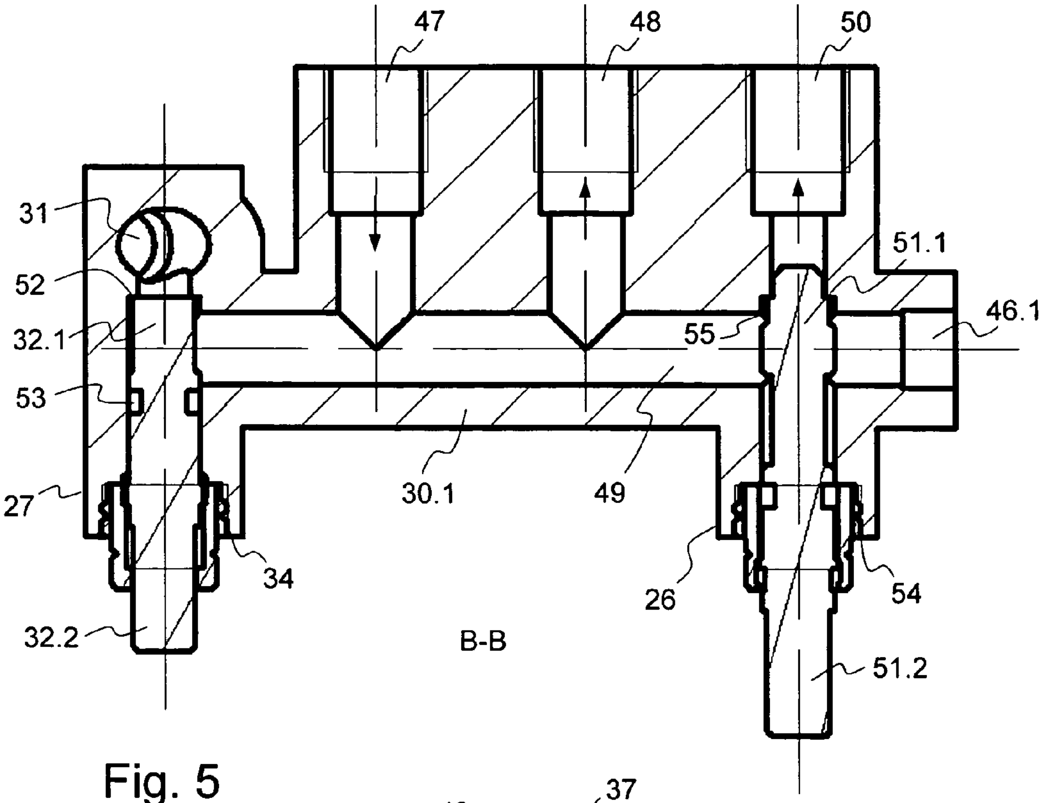
FIG. 5 shows a further part of the air distributor in accordance with the invention in cross section.

FIG. 5 shows the cross section of the part of the air distributor that runs along the line B-B. The limb 30.1 of the air distributor housing 30 comprises a total air connection 47 for the supply of the compressed air. The supplied compressed air is led through the channel 49 to the air regulator 27, the air regulator 26 and the air connection 48 for the pneumatic vibrator 8. Should the pneumatic vibrator 8 not be necessary, the compressed air connection 48 may also be closed. The quantity of air needed for the fluidization of the powder 7 can be set with the help of the air regulator 26. To this end, the air regulator 26 is provided with a setting element 51.1 that, depending on its position, constitutes a settable slot 55 together with the air distributor housing 30. Furthermore, the air regulator 26, is provided with a setting shaft 51.2 that is joined with the setting element 51.1 and is supported in the housing 30 by means of a thread 54. The setting element 51.1 can be moved in the axial direction along the setting shaft 51.2. The opening in the limb 30.1 of the air distributor housing 30 needed for the production of the air channel 49 is closed by means of a closure 46.1.

Advantageously, the assembly of the individual valve components is effected from a single side of the air distributor housing 30.

Figure 6:
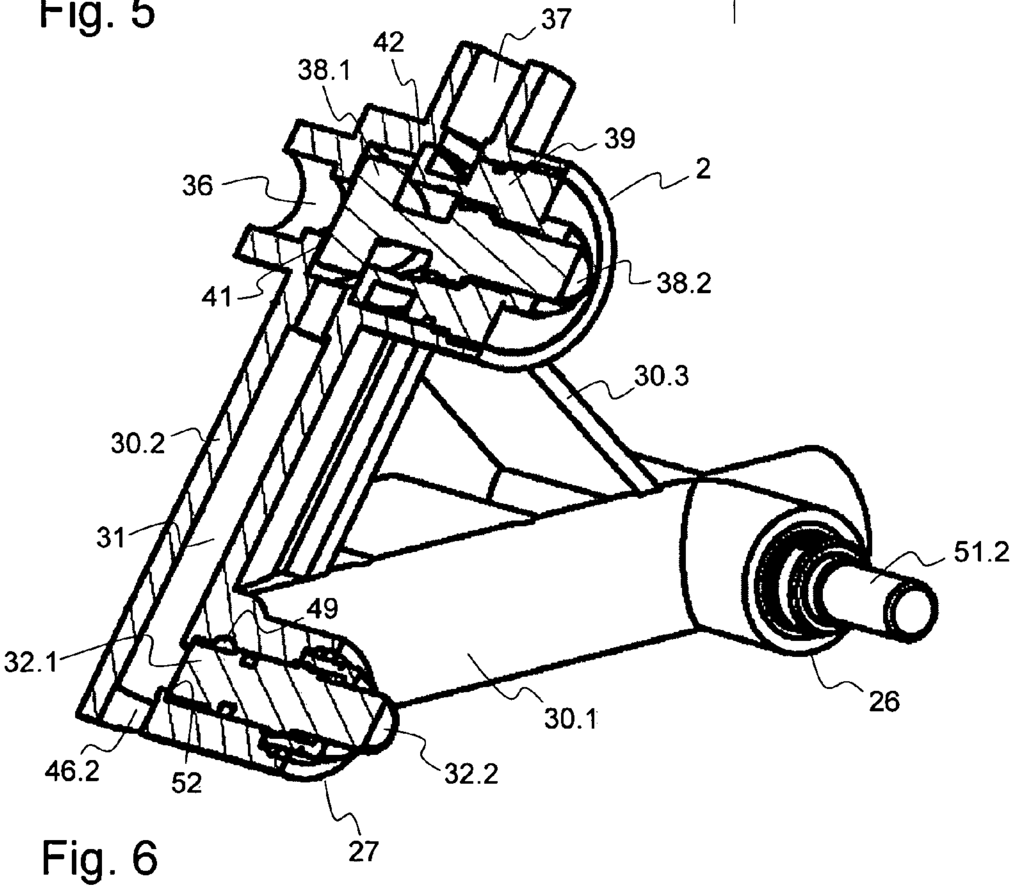
FIG. 6 shows a three-dimensional view of the air distributor in accordance with the invention, a part thereof being represented in section.
Figure 7:
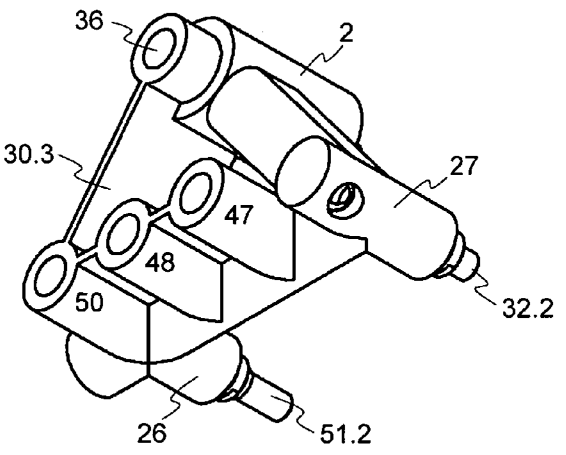
FIG. 7 shows a first three-dimensional view of the air distributor.
Figure 8:
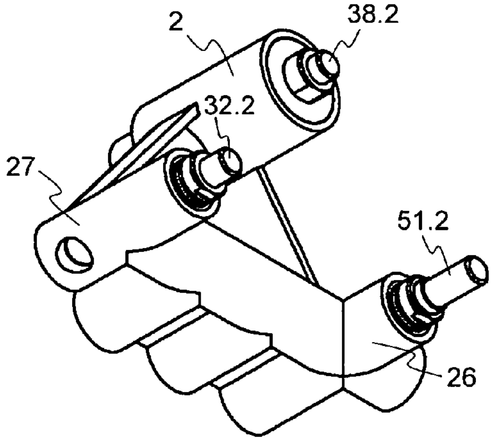
FIG. 8 shows a second three-dimensional view of the air distributor in accordance with the invention.
Figure 9:
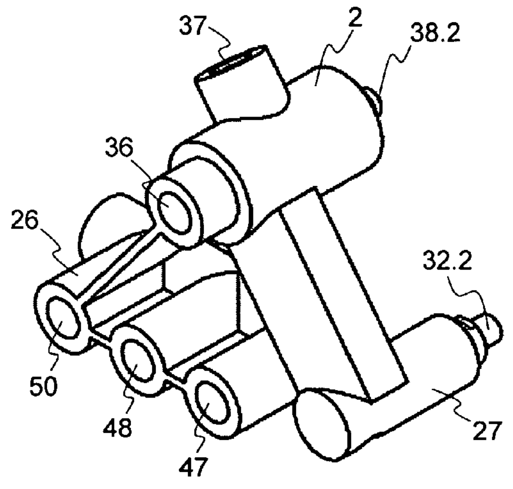
FIG. 9 shows a third three-dimensional view of the air distributor in accordance with the invention.
Figure 10:
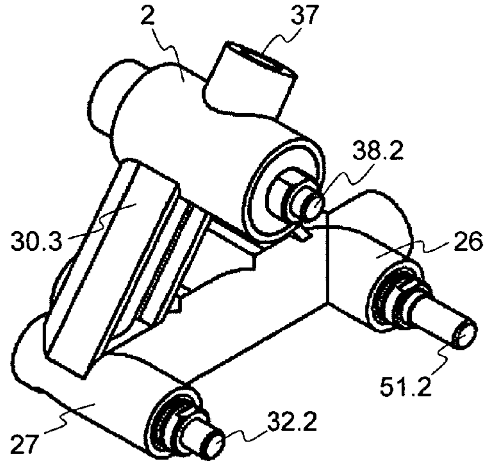
FIG. 10 shows a fourth three-dimensional view of the air distributor in accordance with the invention.

A three-dimensional view of the entire air distributor, comprising also a section view of the limb 30.2 of the air distributor housing 30, is shown in FIG. 6.

FIGS. 7 to 10 show four different three-dimensional views of the air distributor.

Figure 11:
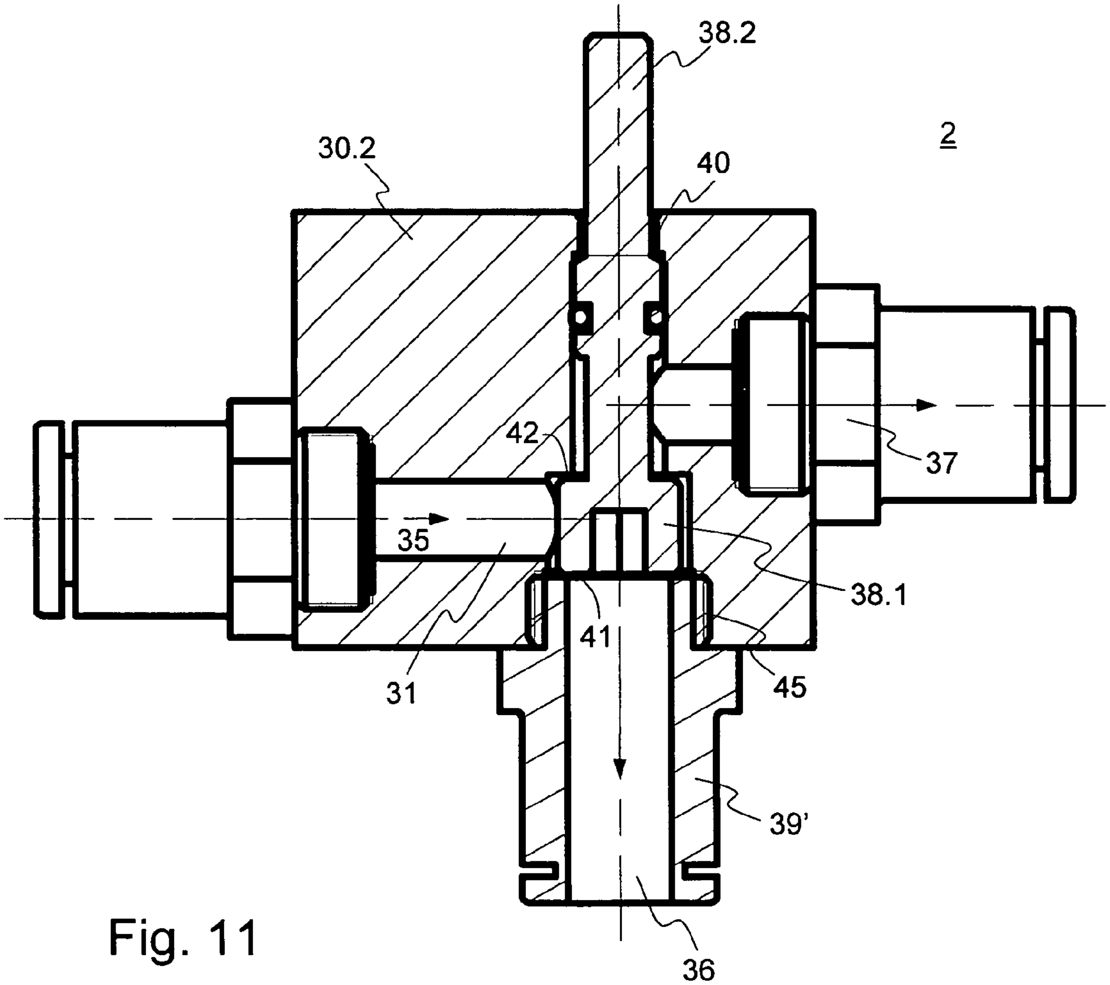
FIG. 11 shows a part of a second embodiment of the air distributor in accordance with the invention.

A second embodiment of the compressed air distributor 2, which forms part of the entire air distributor, can be seen in FIG. 11. The second embodiment differs from the first embodiment by virtue of the fact that the setting element 38.1 with the setting shaft 38.2 is now led directly out of the air distributor housing 30. The setting of the position of the setting element 38.1 is obtained by means of the thread 40 provided in the limb 30.2 of the air distributor housing 30. After the setting shaft 38.2 has been built into the air distributor housing 30 together with the setting element 38.1, a second embodiment of the sheath, identified by the reference number 39', is screwed into the thread 45 provided for this purpose in the air distributor housing 30.

In principle, the setting of the overall slot size is obtained in the manner already described in the case of the first embodiment. After the setting shaft 38.2 and the sheath 39' have been screwed into the air distributor housing 30 right up to the stop, which means that the two slot sizes 41 and 42 have been reduced to zero, the sheath 39' is again screwed out of the air distributor housing 30 until the desired overall slot size is obtained. The distribution of the compressed air to the compressed air connections 36 and 37 is obtained in the manner already described for the first embodiment.

Both the procedure for the assembly of the air distributor in accordance with FIGS. 3 to 10 and the procedure for the assembly of the air distributor in accordance with FIG. 11 have the advantage that the tolerances of the air distributor housing, the sheath and the setting element do not have to satisfy any particularly stringent requirements. Any inaccuracies incurred during the production can be readily compensated by means of the two described assembly procedures. A further advantage consists of the fact that the proposed assembly procedures can be used at some subsequent point of time to preset the maximum possible displacement path for the setting element, and this without there being any need for constructional modifications of the setting element, the sheath or the air distributor housing.

The air distributor housing 30 can be produced from plastics with the help of a injection-molding procedure. Polyoxymethylene (POM), polyamide (PA) or polyethylene (PE) are particularly suitable as plastic material.

The above description of the embodiments in accordance with the present invention is intended only for illustrative purposes and not for the purpose of limiting the invention. Various changes and modifications are possible within the framework of the invention without overstepping the extent of the invention and its equivalents.

The invention claimed is:

1. An air distributor for a compressed-air-operated powder transportation unit of a powder coating device, comprising:

an air distributor housing that has an assembly opening, a compressed air inlet and a first and a second compressed air outlet, a sheath which can be built into the assembly opening and is provided with an air channel which is connected to the first compressed air outlet, and a setting element which, together with the sheath, constitutes a first valve by means of which the compressed air inlet can be connected to the first air channel and the first compressed air outlet, and which, together with the air distributor housing, constitutes a second valve by means of which the compressed air inlet can be connected to the second compressed air outlet, where the opening widths of the two valves can be set by means of the position of the setting element, wherein in the air distributor housing there is provided a compressed air channel that is connected to the compressed air inlet, and in the air distributor housing there is provided an air regulator by means of which the air in the compressed air channel can be set.

2. An air distributor according to claim 1, wherein the setting element is attached to a setting shaft, and the sheath is provided with an opening through which there projects the setting shaft.

3. An air distributor according to claim 2, wherein the setting shaft of the setting element and the air regulator are led out of the air distributor housing on one side of the air distributor housing.

4. An air distributor according to claim 1, wherein the setting element is attached to a setting shaft, and wherein the air distributor housing is provided with an opening through which there projects the setting shaft.

5. An air distributor according to claim 1, wherein the setting element is of a cylindrical shape and is axially moveably supported.

6. An air distributor according to claim 1, wherein the first face side of the setting element and the face side of the sheath running parallel to the first face side constitute the first valve opening, and wherein the second face side of the setting element and a surface of the air distributor housing that runs parallel to the second face side and lies opposite the second face side constitute the second valve opening.

7. An air distributor according to claim 1, wherein the air distributor housing is made of plastics.

8. An air distributor according to claim 7, wherein the plastics is polyoximethylene, polyamide or polyethylene.

9. An air distributor according to claim 1, wherein the air distributor housing, the sheath and the setting element are designed in such a manner that the sum of the air flows that pass through the two valves is constant and independent of the position of the setting element.

10. An air distributor according to claim 1, wherein in the air distributor housing there is provided a further compressed air channel that is connected on one side to the air regulator and on the other side, via a further air regulator, to a third compressed air outlet in the air distributor housing, and the air at the third compressed air outlet can be set by means of the further air regulator.

11. An air distributor according to claim 10, wherein the setting elements are arranged in a triangular pattern.

12. An air distributor according to claim 1, wherein the air distributor housing is designed to be triangular in shape.

13. A powder coating device comprising an air distributor according to claim 1, wherein a compressed air inlet of the air distributor is connected to a compressed air source, the first pressure outlet is connected to a dosing air connection, and the second compressed air outlet is connected to a transportation air connection of a powder transportation unit.

* * * * *